(12) United States Patent  (10) Patent No.: US 9,058,751 B2
Dohring et al.  (45) Date of Patent: Jun. 16, 2015

(54) LANGUAGE PHONEME PRACTICE ENGINE

(75) Inventors: Doug Dohring, Glendale, CA (US); David Hendry, La Crescenta, CA (US); Stephanie Yost, Glendale, CA (US); Jerry Chiawei Chen, Saratoga, CA (US)

(73) Assignee: AGE OF LEARNING, INC., Glendale, CA (US)

( * ) Notice: Subject to any disclaimer, the term of this patent is extended or adjusted under 35 U.S.C. 154(b) by 0 days.

(21) Appl. No.: 13/301,668

(22) Filed: Nov. 21, 2011

(65) Prior Publication Data

US 2013/0130212 A1  May 23, 2013

(51) Int. Cl.
*G09B 19/06* (2006.01)
*G09B 19/04* (2006.01)

(52) U.S. Cl.
CPC ............... *G09B 19/06* (2013.01); *G09B 19/04* (2013.01)

(58) Field of Classification Search
CPC ............................... G09B 19/06; G09B 19/04
USPC ......................................... 434/157, 167, 169
See application file for complete search history.

(56) References Cited

U.S. PATENT DOCUMENTS

| | | | |
|---|---|---|---|
| 5,429,513 A * | 7/1995 | Diaz-Plaza | 434/167 |
| 6,331,115 B1 | 12/2001 | Jenkins et al. | |
| 6,604,947 B1 * | 8/2003 | Rai | 434/170 |
| 7,200,581 B2 | 4/2007 | Taggart et al. | |
| 7,421,391 B1 | 9/2008 | Merkel | |
| 7,524,191 B2 | 4/2009 | Marmorstein et al. | |
| 8,740,620 B2 | 6/2014 | Dohring et al. | |
| 8,784,108 B2 | 7/2014 | Dohring et al. | |
| 2002/0029146 A1 | 3/2002 | Nir | |
| 2002/0094511 A1 * | 7/2002 | Li | 434/167 |

(Continued)

FOREIGN PATENT DOCUMENTS

| | | |
|---|---|---|
| CN | 101105894 A | 1/2008 |
| JP | 2001-337595 | 12/2001 |

(Continued)

OTHER PUBLICATIONS http://web.archive.org/web/20060509123522/http://www.questforlearning.com/phonograms.htm, May 9, 2006.*

(Continued)

*Primary Examiner* — Xuan Thai
*Assistant Examiner* — Michael Grant
(74) *Attorney, Agent, or Firm* — Wilson Sonsini Goodrich & Rosati

(57) ABSTRACT

Disclosed herein, in certain embodiments, are computer-based language phoneme practice systems, products, programs, and methods comprising a digital processing device and a computer program that creates a language phoneme practice engine, wherein said engine comprises: a taxonomy of phonemes of a target language; a software module for providing an interface for practicing each said phoneme in said taxonomy, wherein said interface allows a learner to optionally access a visual representation and an auditory representation of each said phoneme in said taxonomy; and a software module for providing an interface for practicing each said phoneme in the context of the beginning, middle, and end of words of said target language, wherein said interface allows a learner to optionally access a visual and an auditory representation of each said word and each said phoneme in each said word.

19 Claims, 5 Drawing Sheets

(56) References Cited

U.S. PATENT DOCUMENTS

| | | | |
|---|---|---|---|
| 2002/0160341 A1* | 10/2002 | Yamada et al. | 434/157 |
| 2004/0152054 A1 | 8/2004 | Gleissner et al. | |
| 2005/0048449 A1 | 3/2005 | Marmorstein et al. | |
| 2005/0052405 A1 | 3/2005 | Maulik et al. | |
| 2006/0073462 A1 | 4/2006 | Tetreault | |
| 2006/0093996 A1* | 5/2006 | Goldman et al. | 434/171 |
| 2007/0048699 A1 | 3/2007 | MacGregor et al. | |
| 2007/0099158 A1* | 5/2007 | Moran et al. | 434/156 |
| 2007/0224578 A1 | 9/2007 | De Ley et al. | |
| 2008/0070203 A1 | 3/2008 | Franzblau | |
| 2008/0077388 A1 | 3/2008 | Nash et al. | |
| 2008/0160487 A1 | 7/2008 | Fairfield et al. | |
| 2008/0182230 A1 | 7/2008 | Stone | |
| 2008/0206724 A1 | 8/2008 | Volden | |
| 2008/0280269 A1* | 11/2008 | Yeung et al. | 434/157 |
| 2008/0294433 A1* | 11/2008 | Yeung et al. | 704/235 |
| 2009/0061398 A1 | 3/2009 | Keim et al. | |
| 2009/0098524 A1 | 4/2009 | Walton | |
| 2009/0204406 A1 | 8/2009 | Keim et al. | |
| 2009/0307203 A1 | 12/2009 | Keim et al. | |
| 2009/0317776 A1 | 12/2009 | Keim et al. | |
| 2010/0081115 A1 | 4/2010 | Harding et al. | |
| 2010/0143873 A1 | 6/2010 | Keim et al. | |
| 2010/0143874 A1* | 6/2010 | Keim et al. | 434/169 |
| 2010/0248194 A1 | 9/2010 | Renduchintala et al. | |
| 2010/0323332 A1 | 12/2010 | Keim et al. | |
| 2011/0014595 A1* | 1/2011 | Birr | 434/185 |
| 2011/0027762 A1 | 2/2011 | Keim et al. | |
| 2011/0053123 A1* | 3/2011 | Lonsdale | 434/157 |
| 2011/0065082 A1 | 3/2011 | Gal et al. | |
| 2011/0104646 A1* | 5/2011 | Harte | 434/167 |
| 2012/0164609 A1* | 6/2012 | Kehoe | 434/157 |
| 2013/0059276 A1 | 3/2013 | Allen et al. | |
| 2013/0130210 A1 | 5/2013 | Dohring et al. | |
| 2013/0130211 A1 | 5/2013 | Dohring et al. | |
| 2014/0227667 A1 | 8/2014 | Dohring et al. | |
| 2014/0295386 A1 | 10/2014 | Dohring et al. | |

FOREIGN PATENT DOCUMENTS

| | | |
|---|---|---|
| KR | 10-2002-0045757 | 6/2002 |
| KR | 10-2003-0049791 | 6/2003 |
| KR | 10-2004-0065593 | 7/2004 |
| KR | 10-0791024 | 1/2008 |
| KR | 10-2009-0089504 | 8/2009 |

OTHER PUBLICATIONS http://web.archive.org/web/20060509123456/http://www.questforlearning.com/pshome.htm, May 9, 2006.* http://web.archive.org/web/20080724095942/http://www.homeschoolingfromtheheart.com/hsreviews/phonics/phsolution.html, Jul. 24, 2008.*

Levis J. et al., "Integrating Pronunciation into ESL/EFL Classrooms," TESOL, Journal, vol. 12, No. 2, pp. 13-19.

Rosetta Stone, http://www.rosettastone.com/schools, Accessed Mar. 3, 2011.

Tell Me More, http://www.tellmemore.com/, Accessed Mar. 3, 2011.

Cocinella, http://www.3dlanguage.net/, Accessed Mar. 3, 2011.

eBerlitz, http://www.berlitz.us/, Accessed Mar. 3, 2011.

Scientifice Learning Progress Tracker, http://www.scilearn.com/products/fast-forward-language-series/, Accessed Mar. 3, 2011.

Byki Software, http://www.transparent.com/education/byki-online.html, Accessed Mar. 3, 2011.

Babbel Learning; http://www.babbel.com/, Accessed Mar. 3, 2011.

Mango Languages, http://www.mangolanguages.com/, Accessed Mar. 3, 2011.

PCT/US2012/065933 International Search Report dated Apr. 19, 2013.

U.S. Appl. No. 13/301,660 Office Action dated Jul. 17, 2013.

U.S. Appl. No. 13/301,639 Final Action dated Apr. 19, 2013.

U.S. Appl. No. 13/301,639 Office Action dated Nov. 7, 2012.

CN201210276526.3 Office Action dated Jul. 28, 2014 (w/English translation).

CN201210276527.8 Office Action dated Jul. 25, 2014 (w/English translation).

CN201210276529.7 Office Action dated Jul. 25, 2014 (w/English translation).

PCT/US2012/065933 International Preliminary Report on Patentability dated Jun. 5, 2014.

PCT/US2012/065936 International Preliminary Report on Patentability dated Jun. 5, 2014.

U.S. Appl. No. 13/301,639 Office Action dated Oct. 7, 2013.

U.S. Appl. No. 13/301,660 Office Action dated May 9, 2014.

U.S. Appl. No. 14/255,852 Office Action dated Oct. 9, 2014.

* cited by examiner

LANGUAGE PHONEME PRACTICE ENGINE

BACKGROUND OF THE INVENTION

Interest in and support for language study has strengthened in recent years due to the growing recognition that proficiency in more than one language benefits both individual learners and society. For the individual language learner, research has found a positive link between second language proficiency and cognitive and academic ability. In addition to developing a lifelong ability to communicate with people from other countries and backgrounds, individual benefits include improved overall school performance, superior problem-solving skills, and enhanced creativity and cognitive flexibility. Bamford, K. W., et al. (1991). Additive-bilingual (immersion) education: Cognitive and language development. Language Learning, 41:413-429; Hakuta, K. (1986). Mirror of language. New York: Basic Books.

From a societal perspective, a multilingual workforce enhances economic competitiveness and promotes tolerance and intercultural awareness. Americans fluent in other languages improve global communication and enhance U.S. economic competitiveness abroad. Center for Applied Linguistics (2004): Why, How, and When Should My Child Learn a Second, available at http://www.cal.org/resources/pubs/whyhowwhen_brochure.pdf. As a result, students of foreign languages often have better career opportunities. This is especially true for those learning English as an additional or foreign language. While English is the third most natively spoken language in the world, after Mandarin Chinese and Spanish, English has become the leading language of international discourse, including business and scientific discourse, and has acquired use as lingua franca in many regions. Crystal, D. (1997). English as a Global Language. Cambridge: Cambridge University Press; Wardhaugh, R. (2006). An introduction to sociolinguistics. Wiley-Blackwell.

Most English language learners view pronunciation as an important part of learning to speak. However, non-native-like pronunciation is a major challenge for many. Despite the recognized importance of pronunciation, most language courses emphasize general oral communication over pronunciation and teachers often remain uncertain about how to incorporate pronunciation into curriculum. Levis, J., et al. (2003). Integrating Pronunciation into ESL/EFL Classrooms. TESOL Journal, 12(2):13-19.

SUMMARY OF THE INVENTION

Phonemes are the abstract units of a language that correspond to a set of similar speech sounds which are perceived to be a single distinctive sound in the language. Awareness of the phonemes of a new language, their sounds, and their use in constructing and deconstructing words are the base skills required for learning first (e.g., native) and additional (e.g., second, additional, or foreign) languages. Therefore, an effective language immersion teaching environment should introduce the phonemes of a target language and offer an organization, such as a taxonomy, to help learners access, navigate, and remember the phonemes. Moreover, an effective language immersion teaching environment should provide a phoneme practice engine that allows learners to practice seeing, hearing, and pronouncing each phoneme and each said phoneme in the context of the beginning, middle, and end of words of the target language.

Technology is an increasingly influential factor in education and offers new opportunities to create powerful learning tools. Multimedia technology provides new ways to engage learners, such as through the creation of an interactive language immersion teaching environment. In such an environment, learners can see visual representations and hear auditory representations of the phonemes of a target language. Multimedia technology also provides new ways to model phonemes, phonemes in the context of words, vocabulary, sentence structures, and common conversational patterns as well as new ways to facilitate learner practice and evaluation. Despite these potentials, current computer-based environments do not provide adequate focus on the phonemes of a target language. Specifically, they do not offer full-featured, educationally sound interfaces for practicing phonemes and phonemes in the context of words.

Disclosed herein, in certain embodiments, are computer-based language phoneme practice systems comprising: a digital processing device that is optionally connected to a computer network, wherein said processing device comprises an operating system configured to perform executable instructions; and a computer program, provided to said digital processing device, including executable instructions that create a language phoneme practice engine, wherein said engine comprises: a taxonomy of phonemes of a target language; a software module for providing an interface for practicing each said phoneme in said taxonomy, wherein said interface allows a learner to optionally access a visual representation and an auditory representation of each said phoneme in said taxonomy; and a software module for providing an interface for practicing each said phoneme in the context of the beginning, middle, and end of words of said target language, wherein said interface allows a learner to optionally access a visual and an auditory representation of each said word and each said phoneme in each said word. In some embodiments, the taxonomy of phonemes includes one or more phonemes represented by a single letter and phonemes represented by one or more combinations of letters. In some embodiments, the taxonomy of phonemes includes one or more phonemes represented by an image. In some embodiments, the taxonomy is comprehensive and comprises all sounds in said target language. In other embodiments, the taxonomy is partial and comprises some of the sounds in said target language. In some embodiments, the module for providing an interface for practicing each said phoneme in the context of the beginning, middle, and end of words identifies a selected phoneme in each word. In some embodiments, the visual representation of each said word comprises a photographic image or an illustration. In some embodiments, the system further comprises a software module for recording said learner's pronunciation of said phonemes and said words and comparing it to one or more model pronunciations of said phonemes and said words. In further embodiments, the software module for recording said learner's pronunciation and comparing it to one or more model pronunciations is configured to provide visual feedback in the form of waveform analysis or a pronunciation score. In some embodiments, the system further comprises a software module for providing translation of audio voiceover and/or text from said target language to a specified language, wherein said translation is both written and voiced. In further embodiments, the software module for providing translation is configurable to optionally translate one or more of: all voiceover and/or text, voiceover and/or text associated with learning content, voiceover and/or text associated with instructions, voiceover and/or text associated with navigation, and no voiceover and/or text. In further embodiments, the software module for providing translation of voiceover and/or text maintains a list of recent voiceovers and/or text, wherein said list provides access to both written and voiced translation of each said recent voiceover and/or text. In some embodiments, the software module for providing translation of voiceover and/or text is regulated by a mentor, wherein said mentor determines the types of voiceover and/or text translated. In some embodiments, the software module for providing translation of voiceover and/or text is regulated by a learner, wherein said learner determines the types of voiceover and/or text translated. In some embodiments, the phoneme practice system is a component of a larger language immersion teaching system. In further embodiments, the language immersion teaching system comprises a plurality of learning activities organized according to an instructional plan, wherein said instructional plan comprises a progression of educational objectives including teaching phoneme sounds, phoneme sounds in the context of the beginning, middle, and end of words, word families, vocabulary in the context of environments or themes, sentence structures, and common conversational patterns. In some embodiments, the target language is one or more of: English, Spanish, Italian, Portuguese, French, Dutch, Polish, German, Russian, Ukrainian, Mandarin, Wu, Cantonese, Hindi, Punjabi, Bengali, Marathi, Urdu, Arabic, Turkish, Tamil, Farsi, Japanese, Korean, Vietnamese, That, Burmese, Malay, Telugu, Javanese, and Tagalog. In further embodiments, the target language is English.

Also disclosed herein, in certain embodiments, are computer readable media encoded with a computer program including instructions executable by the operating system of a digital processing device, wherein said instructions create a language phoneme practice engine, wherein said engine comprises: a taxonomy of phonemes of a target language; a software module for providing an interface for practicing each said phoneme in said taxonomy, wherein said interface allows a learner to optionally access a visual representation and an auditory representation of each said phoneme in said taxonomy; and a software module for providing an interface for practicing each said phoneme in the context of the beginning, middle, and end of words of said target language, wherein said interface allows a learner to optionally access a visual and an auditory representation of each said word and each said phoneme in each said word. In some embodiments, the target language is one or more of: English, Spanish, Italian, Portuguese, French, Dutch, Polish, German, Russian, Ukrainian, Mandarin, Wu, Cantonese, Hindi, Punjabi, Bengali, Marathi, Urdu, Arabic, Turkish, Tamil, Farsi, Japanese, Korean, Vietnamese, That, Burmese, Malay, Telugu, Javanese, and Tagalog. In further embodiments, the target language is English.

Also disclosed herein, in certain embodiments, are computer-implemented language phoneme practice methods comprising the step of providing executable instructions to a digital processing device comprising an operating system configured to perform executable instructions, to create a language phoneme practice engine, wherein said engine comprises: a taxonomy of phonemes of a target language; a software module for providing an interface for practicing each said phoneme in said taxonomy, wherein said interface allows a learner to optionally access a visual representation and an auditory representation of each said phoneme in said taxonomy; and a software module for providing an interface for practicing each said phoneme in the context of the beginning, middle, and end of words of said target language, wherein said interface allows a learner to optionally access a visual and an auditory representation of each said word and each said phoneme in each said word. In some embodiments, the target language is one or more of: English, Spanish, Italian, Portuguese, French, Dutch, Polish, German, Russian, Ukrainian, Mandarin, Wu, Cantonese, Hindi, Punjabi, Bengali, Marathi, Urdu, Arabic, Turkish, Tamil, Farsi, Japanese, Korean, Vietnamese, That, Burmese, Malay, Telugu, Javanese, and Tagalog. In further embodiments, the target language is English.

DETAILED DESCRIPTION OF THE INVENTION

Figure 1:
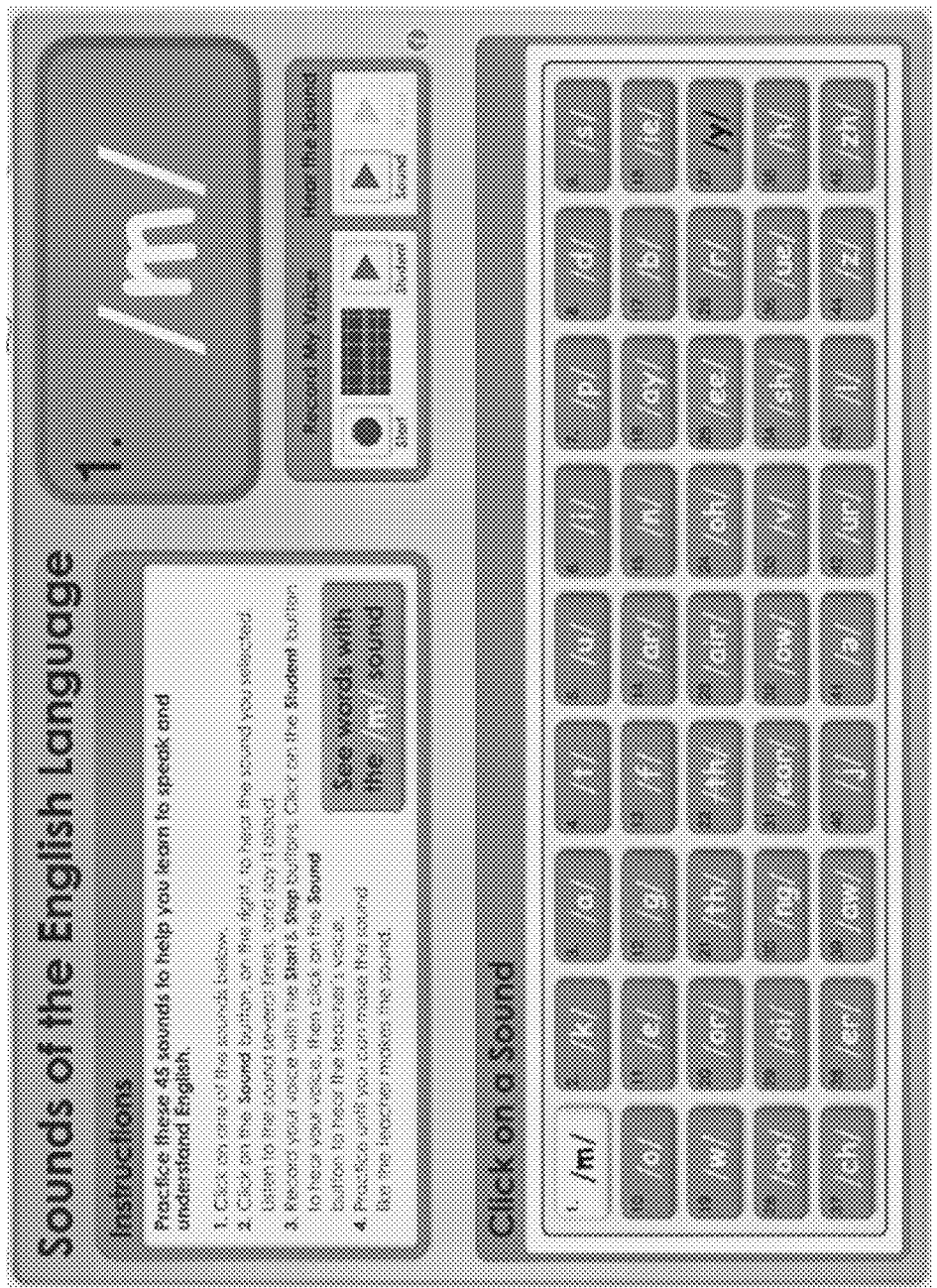
FIG. 1 shows a non-limiting example of a software module for providing an interface for practicing the phonemes of a target language; in this case, an interface for practicing all of the phonemes in a taxonomy of phonemes by accessing a visual representation and an auditory representation of each phoneme.

Existing language practice systems fail to clearly organize or classify the phonemes of a target language and fail to offer effective practice environments that allow language learners to see, hear, and pronounce phonemes. As a result, language learners often develop poor pronunciation of the phonemes and words of their target language. Thus, a primary objective of the systems, products, programs, and methods for practicing language phonemes described herein is to help language learners develop native-like pronunciations of the phonemes, words, sentence structures, and conversational patterns of a target language. Another objective of the systems, products, programs, and methods disclosed herein is to provide a taxonomy of phonemes of a target language that is effective to help learners access, navigate, and remember the phonemes. Yet another objective of the systems, products, programs, and methods disclosed herein is to provide an interface for practicing each phoneme in the taxonomy that includes a visual representation and an auditory representation of each phoneme. Yet another objective of the systems, products, programs, and methods disclosed herein is to provide an interface for practicing each phoneme in the context of the beginning, middle, and end of words of a target language that includes a visual representation and an auditory representation of each word and each phoneme in each word.

Disclosed herein, in various embodiments, are computer-based language phoneme practice systems comprising: a digital processing device that is optionally connected to a computer network, wherein said processing device comprises an operating system configured to perform executable instructions; and a computer program, provided to said digital processing device, including executable instructions that create a language phoneme practice engine, wherein said engine comprises: a taxonomy of phonemes of a target language; a software module for providing an interface for practicing each said phoneme in said taxonomy, wherein said interface allows a learner to optionally access a visual representation and an auditory representation of each said phoneme in said taxonomy; and a software module for providing an interface for practicing each said phoneme in the context of the beginning, middle, and end of words of said target language, wherein said interface allows a learner to optionally access a visual and an auditory representation of each said word and each said phoneme in each said word.

Also disclosed herein, in various embodiments, are computer readable media encoded with a computer program including instructions executable by the operating system of a digital processing device, wherein said instructions create a language phoneme practice engine, wherein said engine comprises: a taxonomy of phonemes of a target language; a software module for providing an interface for practicing each said phoneme in said taxonomy, wherein said interface allows a learner to optionally access a visual representation and an auditory representation of each said phoneme in said taxonomy; and a software module for providing an interface for practicing each said phoneme in the context of the beginning, middle, and end of words of said target language, wherein said interface allows a learner to optionally access a visual and an auditory representation of each said word and each said phoneme in each said word.

Also disclosed herein, in various embodiments, are computer-implemented language phoneme practice methods comprising the step of providing executable instructions to a digital processing device comprising an operating system configured to perform executable instructions, to create a language phoneme practice engine, wherein said engine comprises: a taxonomy of phonemes of a target language; a software module for providing an interface for practicing each said phoneme in said taxonomy, wherein said interface allows a learner to optionally access a visual representation and an auditory representation of each said phoneme in said taxonomy; and a software module for providing an interface for practicing each said phoneme in the context of the beginning, middle, and end of words of said target language, wherein said interface allows a learner to optionally access a visual and an auditory representation of each said word and each said phoneme in each said word.

VARIOUS DEFINITIONS

The term "learner," as used herein, refers to a person who interacts with an educational system for the purpose of gaining knowledge, insight, or understanding of one or more target languages or by virtue of having been allowed, asked, or assigned to interact with an educational system.

The term "mentor," as used herein, refers to a person who has an interest in, or responsibility for, facilitating or furthering the educational development of a learner and includes, by way of non-limiting examples, a parent, step-parent, adoptive parent, foster parent, grandparent, guardian, relative, friend, guide, employer, tutor, instructor, teacher, or professor, of a learner.

As used herein, "target language" means a native, first, second, additional, or foreign language that a learner desires to learn or has been allowed, asked, or assigned to learn for any reason.

As used herein, "immersion" is a method of teaching a target language in which the target language is optionally used for instruction, correction, encouragement, and/or navigation as well as for the content of subject material. Immersion uses the target language as a teaching tool, optionally and variably surrounding or "immersing" learners in the target language.

As used herein, "taxonomy" means a particular classification or organization of a plurality of elements. Taxonomies may arrange elements into groups and may arrange elements or groups in a hierarchical structure (e.g., groups and sub-groups). Taxonomies may be comprehensive, classifying all elements within the subject matter, or may be partial, only classifying a portion of the elements within the subject matter.

As used herein, "phoneme" means any of the abstract units of a language that correspond to a set of similar speech sounds which are perceived to be a single distinctive sound in the language.

As used herein, "practice" means a learning method based on repetition of rehearsal or actual engagement in a behavior for the purpose of accomplishing one or more specific educational objectives or to maintain previously acquired skills. Practice may involve presenting a learner with multiple opportunities to see, hear, and/or pronounce phonemes, words, sentences, conversations, or other aspects of a target language.

The term "instructional designer," as used herein, refers to any person who designs and/or evaluates learning activities, and grouped sequences of activities, that are elements of an educational system.

The term "instructional plan," as used herein, refers to a plan, conceived by an instructional designer or a mentor to a learner, designed to accomplish one or more specific educational objectives through the mutual reinforcement of individual learning activities.

The term "standalone application," as used herein, refers to a program that is run as an independent computer process, not an add-on to an existing process. Standalone applications are often compiled and executable.

Language Phoneme Practice Engine

The systems, products, programs, and methods for practicing language phonemes disclosed herein include a language phoneme practice engine. In some embodiments, the engine includes a taxonomy of phonemes in a target language. In further embodiments, the engine includes a software module that provides an interface for learners to practice each phoneme in the taxonomy. In further embodiments, the engine includes a software module that provides an interface for learners to practice each phoneme in the context of the beginning, middle, and end of words of the target language. In still further embodiments, the interfaces allow learners to optionally access visual and auditory representations of each word and each phoneme in each word.

In a particular embodiment, the taxonomy of phonemes is designed to help learners access, navigate, and remember the phonemes of a target language. In a further embodiment, the software modules that provide interfaces for learners to practice phonemes and phonemes in the context of the beginning, middle, and end of words of the target language allow learners to access visual and auditory representations to provide practice by seeing, hearing, and pronouncing elements of the target language.

In some embodiments, the language phoneme practice engines are intranet-based. In some embodiments, the language phoneme practice engines are Internet-based. In further embodiments, the phoneme practice engines are World Wide Web-based. In still further embodiments, the phoneme practice engines are cloud computing-based. In other embodiments, the phoneme practice engines are based on data storage devices including, by way of non-limiting examples, CD-ROMs, DVDs, flash memory devices, magnetic disk drives, and optical disk drives.

Target Language

The systems, products, programs, and methods described herein include a taxonomy of phonemes of a target language and software modules for practicing the phonemes in a target language, both alone and in the context of the beginning, middle, and end of words of a target language. In some embodiments, a target language is a language that a learner desires to learn or has been allowed, asked, or assigned to learn. In further embodiments, a target language is the native or first language of a learner. In other embodiments, a target language is a second, additional, or foreign language. In various embodiments, the target language is, by way of non-limiting examples, English, Spanish, Italian, Portuguese, French, Dutch, Polish, German, Russian, Ukrainian, Mandarin, Wu, Cantonese, Hindi, Punjabi, Bengali, Marathi, Urdu, Arabic, Turkish, Tamil, Farsi, Japanese, Korean, Vietnamese, That, Burmese, Malay, Telugu, Javanese, and Tagalog. Suitable target languages include those that are new to a learner, those with which the learner has some familiarity, those with which a learner has proficiency, and those in which a learner is fluent, but is motivated to refine their language skills.

In some embodiments, the learning activities described herein include, by way of non-limiting examples, text, images, video, audio, motion, interactivity, and animation in the target language. In further embodiments, audio includes voiceover audio in the target language. In some embodiments, text, images, video, audio, motion, interactivity, and animation in the target language are used for content of the subject material. In some embodiments, text, images, video, audio, motion, interactivity, and animation in the target language are used for, by way of non-limiting examples, instruction, correction, encouragement, and navigation.

Taxonomy of Phonemes

The systems, products, programs, and methods described herein include a taxonomy of phonemes of a target language and software modules for providing interfaces for practicing each said phoneme alone and in the context of the beginning, middle, and end of words of said target language. In light of the disclosure provided herein, those of skill in the art will recognize that a phoneme is any of the abstract units of a language that correspond to a set of similar speech sounds which are perceived to be a single distinctive sound in the language. Those of skill in the art will further recognize that in transcription, phonemes are often written between slashes. Thus, a phoneme is a sound or a group of slightly different sounds which are perceived to have the same function by speakers of a language. Changing a phoneme within a word often changes the meaning of the word to speakers of a language. In some languages, there is a strong match between individual letters and phonemes. In other languages, there is a weaker match between individual letters and phonemes. For example, in English the letters "c" and "k" can represent the same phoneme as in /c/ar/ and /k/ar/t/. Moreover, changing this phoneme to a different phoneme, in many cases, changes the meaning of the word, for example, /p/ar/ or /p/ar/t/. Words of a language are constructed of phonemes and those proficient with a language recognize phonemes at the beginning, middle, and end of words. For example, in English, the phoneme /m/, represented by the letter "m," is recognized by English speakers at the beginning of /m/a/p/, in the middle of /k/a/m/er/u/, and the end of /h/a/m/. Word families are formed by words that share one, two, or several common phonemes or by words that differ by one, two, or a limited number of phonemes.

The taxonomy of phonemes of the present invention is a particular classification or organization of phonemes of a target language. In some embodiments, the taxonomy organizes phonemes into groups. In further embodiments, groups of phonemes are hierarchical, for example, a taxonomy that organizes phonemes into one or more subgroups within one or more groups. In other embodiments, groups of phonemes are non-hierarchical. In some embodiments, a taxonomy of phonemes includes phonemes represented by a single letter and phonemes represented by one or more combinations of letters. In a particular embodiment, in English, phonemes represented by a single letter include /m/, /k/, /a/, /t/, /u/, /i/, /p/, /d/, /s/, /o/, /e/, /g/, /f/, /n/, /b/, /w/, /r/, /y/, /v/, /h/, /j/, /l/, and /z/ (see e.g., FIG. 1). In a further particular embodiment, in English, phonemes represented by a combination of letters include /ar/, /ay/, /ie/, /or/, /th/, /air/, /oh/, /ee/, /oo/, /oi/, /ng/, /ear/, /ow/, /sh/, /ue/, /ch/, /er/, /aw/, and /zh/ (see e.g., FIG. 1). In some embodiments, a taxonomy of phonemes includes phonemes represented by a symbol. In a particular embodiment, phonemes represented by a symbol include /ə/ (also referred to as schwa). In some embodiments, a taxonomy of phonemes includes phonemes represented by an image. In further embodiments, the image is a photograph, illustration, video, or animation of, by way of non-limiting examples, an object, event, or situation, which is associated with the sound of the phoneme.

In some embodiments, a taxonomy of phonemes organizes phonemes into groups for consonant phonemes and vowel phonemes. In a particular embodiment, in Spanish, consonant phonemes letter include /b/, /ch/, /d/, /F/, /g/, /h/, /k/, /l/, /m/, /n/, /ny/, /p/, /r/, /rr/ (e.g., rolling "r"), /s/, /t/, /w/, and /y/. In a further particular embodiment, in Spanish, vowel phonemes include /a/, /e/, /i/, /o/, /u/, /ai/, /au/, /ei/, /eu/, /ia/, /ie/, /io/, /iu/, /sh/, /oi/, /ou/, /ua/, /ue/, /ui/ and /uo/.

In some embodiments, the taxonomy of phonemes is comprehensive, classifying all of the phonemes known to a target language. In other embodiments, the taxonomy of phonemes is partial, classifying a portion of the phonemes known to a target language. In various embodiments, the taxonomy of phonemes classifies about 10%, 20%, 30%, 40%, 50%, 60%, 70%, 80%, 90%, 95%, or 98% of the phonemes known to a target language.

In some embodiments, learning activities are organized according to an instructional plan based on a taxonomy of phonemes of a target language. In further embodiments, the plurality of activities includes one or more activities designed to accomplish one or more educational objectives related to, by way of non-limiting examples, teaching sounds of phonemes, teaching phonemes in the context of the beginning, middle, and end of words, teaching word families, teaching vocabulary in the context of a particular environment, teaching vocabulary in the context of a particular theme, teaching sentence structures, and teaching common conversational patterns.

Practicing Phonemes

The systems, products, programs, and methods described herein include a software module for practicing each phoneme in a taxonomy of phonemes for a target language. Practice a learning method based on repetition of rehearsal or actual engagement in a behavior for the purpose of accomplishing one or more specific educational objectives or to maintain previously acquired skills. Practicing phonemes involves presenting a learner with multiple opportunities to see, hear, and/or pronounce, by way of non-limiting examples, phonemes, words, sentences, conversations, or other aspects of a target language. Accordingly, in some embodiments, the software module for practicing phonemes provides a GUI that allows a learner to optionally access a visual representation and an auditory representation of each said phoneme in said taxonomy. In further embodiments, a visual representation includes, by way of non-limiting examples, a letter, a combination of letters, and one or more letters in slash notation (e.g., /a/) commonly used to describe phonemes. In still further embodiments, a visual representation includes, by way of non-limiting examples, images, videos, animations, and illustrations associated with the sound of the phoneme. In still further embodiments, a visual representation includes combinations of the visual representations described herein. In further embodiments, an auditory representation includes, by way of non-limiting examples, a recorded model pronunciation of a phoneme, a word, a sentence, or a conversation, and a computer generated pronunciation of a phoneme, a word, a sentence, or a conversation. In further embodiments, an auditory representation is included in video or multimedia content. In further embodiments, an auditory representation is included in media formats including, by way of non-limiting examples, Windows Media Video (WMV), Motion Picture Experts Group (MPEG), Audio Video Interleave (AVI), QuickTime®, Real Media®, Windows Media®, Flash®, Silverlight®, Java™, HTML 5, XHTML 5, and Unity®.

In some embodiments, the GUI for practicing phonemes further provides access to a software module for recording a language learner's pronunciation of phonemes and comparing them to one or more model pronunciations. In further embodiments, a software module for recording and comparing pronunciations allows a learner to immediately try, practice, or evaluate their ability to reproduce the sounds demonstrated by a software module for practicing each phoneme in a taxonomy of phonemes for a target language. In some embodiments, the GUI for practicing phonemes further provides access to a software module for providing translation of voiceover and/or text from a target language to a specified language. In further embodiments, a software module for providing translation allows a learner to see and hear instructions, encouragement, corrections, navigational cues, and subject matter content provided by a software module for practicing phonemes in a language more familiar than the target language.

Referring to FIG. 1, in particular embodiments, a software module for practicing each phoneme in a taxonomy of phonemes for a target language includes a button for each phoneme in the taxonomy of phonemes. FIG. 1 depicts a non-limiting example of such a module with a button for each phoneme in a taxonomy of phonemes for the English language. In further embodiments, each button includes a visual representation of a phoneme in the form of a letter or combination of letters. In still further embodiments, interacting with a button activates an audio representation of the sound of the phoneme in the form of a model pronunciation voiceover. Continuing to refer to FIG. 1, in a particular embodiment, the software module for practicing each phoneme further includes access to a software module for practicing each phoneme in the context of the beginning, middle, and end of words of the target language and a software module for recording a language learner's pronunciation of phonemes and comparing them to one or more model pronunciations.

In light of the disclosure provided herein, those of skill in the art will recognize that in various embodiments a software module for practicing each phoneme in a taxonomy of phonemes for a target language is implemented in a multitude of ways. In some embodiments, the software module for practicing phonemes is a feature integrated into the GUI of the phoneme practice engine described herein. In further embodiments, the software module is accessible by interacting with a link or icon integrated into the GUI of the engine. In further embodiments, the software module is in a layer or level above the GUI of the engine. In some embodiments, the software module for practicing phonemes comprises a web browser plug-in, add-in, add-on, or extension. In further embodiments, a web browser, plug-in, add-in, add-on, or extension is accessible via, by way of non-limiting examples, click, right click, menu selection, keystroke, touchscreen gesture, or voice command. In some embodiments, the software module for practicing phonemes comprises a standalone application, which is a program that is run as an independent computer process, not an add-on to an existing process. In further embodiments, a standalone application providing recording and comparison is compiled and executable. In some embodiments, a standalone application is in communication with and adapted for use in conjunction with a language learning activity or a phoneme practice engine, which is implemented separately. In some embodiments, the software module for practicing phonemes comprises a mobile application. In further embodiments, a mobile application is in communication with and adapted for use in conjunction with a language learning activity or a phoneme practice engine, which is implemented separately.

Practicing Phonemes in the Context of Words

The systems, products, programs, and methods described herein include a software module for practicing each phoneme in a taxonomy of phonemes for a target language in the context of the beginning, middle, and end of words of the target language. Practice is a learning method based on repetition of rehearsal or actual engagement in a behavior for the purpose of accomplishing one or more specific educational objectives or to maintain previously acquired skills. Practicing phonemes in the context of words involves presenting a learner with multiple opportunities to see, hear, and/or pronounce, by way of non-limiting examples, phonemes, words, sentences, conversations, or other aspects of a target language. Accordingly, in some embodiments, the software module for practicing phonemes in the context of words provides a GUI that allows a learner to optionally access a visual representation and an auditory representation of each word and each phoneme in said word. In further embodiments, a visual representation includes, by way of non-limiting examples, a letter, a combination of letters, one or more letters in slash notation (e.g., /a/), words, and words written in slash notation (e.g., /m/a/p/) to identify each phoneme in the word. In still further embodiments, a visual representation includes, by way of non-limiting examples, images, videos, animations, and illustrations associated with a word or the sound of the phonemes in a word. In still further embodiments, a visual representation includes combinations of the visual representations described herein. In further embodiments, an auditory representation includes, by way of non-limiting examples, a recorded model pronunciation of a phoneme, a combination of phonemes, a word, a sentence, or a conversation, and a computer generated pronunciation of a phoneme, a combination of phonemes, a word, a sentence, or a conversation. In further embodiments, an auditory representation is included in video or multimedia content. In further embodiments, an auditory representation is included in media formats including, by way of non-limiting examples, Windows Media Video (WMV), Motion Picture Experts Group (MPEG), Audio Video Interleave (AVI), QuickTime®, Real Media®, Windows Media®, Flash®, Silverlight®, Java™, HTML 5, XHTML 5, and Unity®.

In some embodiments, the GUI for practicing phonemes in the context of words further provides access to a software module for recording a language learner's pronunciation of phonemes and words and comparing them to one or more model pronunciations. In further embodiments, a software module for recording and comparing pronunciations allows a learner to immediately try, practice, or evaluate their ability to reproduce the sounds demonstrated by a software module for practicing phonemes in the context of the beginning, middle, and end of words of the target language. In some embodiments, the GUI for practicing phonemes in the context of words further provides access to a software module for providing translation of voiceover and/or text from a target language to a specified language. In further embodiments, a software module for providing translation allows a learner to see and hear instructions, encouragement, corrections, navigational cues, and subject matter content provided by a software module for practicing phonemes in the context of words in a language more familiar than the target language.

Figure 2:
FIG. 2 shows a non-limiting example of a software module for providing an interface for practicing phonemes in the context of the beginning of words in target language; in this case, an interface for practicing phonemes by accessing a visual representation and an auditory representation of each word and each phoneme in each word.

Referring to FIG. 2, in particular embodiments, a software module for practicing each phoneme in a taxonomy of phonemes for a target language in the context of the beginning, middle, and end of words of the target language is adapted for practice of one phoneme at any particular time. FIG. 2 depicts a non-limiting example of such a module for practicing the English phoneme /m/. In further embodiments, the software module includes a visual representation of the phoneme currently practiced (e.g., /m/) and a plurality of words that begin with that phoneme (e.g., map, moon, and man). In still further embodiments, the words are represented in slash notation to indentify the phonemes that make up each word (e.g., /m/a/p/, /m/ue/n/, and /m/a/n/). In still further embodiments, interacting with the individual phonemes in the words activates an audio representation of the sound of the phoneme in the form of a model pronunciation voiceover. In further embodiments, the software module includes an image to represent each word. In still further embodiments, interacting with the image activates an audio representation of the sound of the word in the form of a model pronunciation voiceover.

Figure 3:
FIG. 3 shows a non-limiting example of a software module for providing an interface for practicing phonemes in the context of the middle of words in target language; in this case, an interface for practicing phonemes by accessing a visual representation and an auditory representation of each word and each phoneme in each word.

Referring to FIG. 3, in particular embodiments, the software module includes a visual representation of the phoneme currently practiced (e.g., /m/) and a plurality of words that include that phoneme in the middle of the word (e.g., women and camera).

Figure 4:
FIG. 4 shows a non-limiting example of a software module for providing an interface for practicing phonemes in the context of the end of words in target language; in this case, an interface for practicing phonemes by accessing a visual representation and an auditory representation of each word and each phoneme in each word.

Referring to FIG. 4, in particular embodiments, the software module includes a visual representation of the phoneme currently practiced (e.g., /m/) and a plurality of words that end with that phoneme (e.g., ham, arm, and jam).

Referring FIGS. 2, 3, and 4, in a particular embodiments, the software module for practicing phonemes in the context of words further includes access to a software module for practicing each phoneme in a taxonomy of phonemes of the target language and a software module for recording a language learner's pronunciation of phonemes and words and comparing them to one or more model pronunciations. In further embodiments, the software module for practicing phonemes and the software module for recording and comparing pronunciations are in communication such that the model pronunciations for comparison are coordinated with the phonemes and words currently practiced.

In light of the disclosure provided herein, those of skill in the art will recognize that in various embodiments a software module for practicing each phoneme in a taxonomy of phonemes for a target language in the context of the beginning, middle, and end of words of the target language is implemented in a multitude of ways. In some embodiments, the software module for practicing phonemes in the context of words is a feature integrated into the GUI of the phoneme practice engine described herein. In further embodiments, the software module is accessible by interacting with a link or icon integrated into the GUI of the engine. In further embodiments, the software module is in a layer or level above the GUI of the engine. In some embodiments, the software module for practicing phonemes in the context of words comprises a web browser plug-in, add-in, add-on, or extension. In further embodiments, a web browser, plug-in, add-in, add-on, or extension is accessible via, by way of non-limiting examples, click, right click, menu selection, keystroke, touchscreen gesture, or voice command. In some embodiments, the software module for practicing phonemes in the context of words comprises a standalone application, which is a program that is run as an independent computer process, not an add-on to an existing process. In further embodiments, a standalone application providing recording and comparison is compiled and executable. In some embodiments, a standalone application is in communication with and adapted for use in conjunction with a language learning activity or a phoneme practice engine, which is implemented separately. In some embodiments, the software module for practicing phonemes in the context of words comprises a mobile application. In further embodiments, a mobile application is in communication with and adapted for use in conjunction with a language learning activity or a phoneme practice engine, which is implemented separately.

Learning Activities

The systems, products, programs, and methods described herein, in some embodiments, include a plurality of learning activities. In some embodiments, one or more activities are selected from informal activities including, by way of non-limiting examples, demonstrations, how-to-articles, how-to-videos, and simulations. In some embodiments, one or more activities are selected from preschool activities including, by way of non-limiting examples, songs, chants, books, poems, puzzles, games, art activities, and printable activities. In some embodiments, one or more activities are selected from K-12 activities including, by way of non-limiting examples, books, games, puzzles, art, music, reading assignments, articles, videos, demonstrations, simulations, quizzes, examinations, worksheets, problem sets, brainstorms, and journals. In some embodiments, one or more activities are selected from higher education activities including, by way of non-limiting examples, books, reading assignments, lectures, articles, videos, demonstrations, simulations, mock examinations, quizzes, examinations, essays, laboratory experiments, problem sets, brainstorms, and journals. In some embodiments, one or more activities are selected from professional activities including, by way of non-limiting examples, books, articles, brainstorms, collaborations, group activities, multi-player games, videos, lectures, role-plays, simulations, demonstrations, quizzes, and exams.

In some embodiments, the plurality of activities is organized according to an instructional plan designed to accomplish one or more educational objectives in a target language through the mutual reinforcement of individual activities. In further embodiments, an instructional plan interconnects two or more activities associated with a subject in such a way that understanding is built progressively with one or more activities adding to the educational messages of one or more previous activities. In some embodiments, an instructional designer constructs an instructional plan. In other embodiments, a mentor to a learner constructs an instructional plan. In other embodiments, a software module constructs an instructional plan according to the requirements of one or more published educational standards.

In some embodiments, the instructional plan is based on a taxonomy of phonemes in a target language. In further embodiments, the instructional plan comprises a progression of educational objectives including teaching phoneme sounds, phoneme sounds in the context of the beginning, middle, and end of words, word families, vocabulary in the context of environments or themes, sentence structures, and common conversational patterns. In some embodiments, the plurality of activities includes activities designed to accomplish one or more educational objectives related to teaching sounds of phonemes and teaching phonemes in the context of the beginning, middle, and end of words. In some embodiments, the plurality of activities includes activities designed to accomplish one or more educational objectives related to teaching one or more word families. In some embodiments, the plurality of activities includes activities designed to accomplish one or more educational objectives related to teaching vocabulary in the context of a particular environment or theme. In some embodiments, the plurality of activities includes activities designed to accomplish one or more educational objectives related to teaching sentence structures and common conversational patterns.

In various embodiments, an instructional plan addresses, by way of non-limiting examples, a lesson, a learning unit, and a level of study. In some embodiments, an instructional plan addresses a lesson, which is one or more learning activities that teach toward a specific educational objective or a specific element of a published educational standard. In some embodiments, an instructional plan addresses a learning unit, which is one or more lessons that teach toward a general educational objective or a general element of a published educational standard. In some embodiments, an instructional plan addresses a level of study, which is one or more learning units that teach toward a plurality of general educational objectives or an overarching element of a published educational standard.

In some embodiments, learning activities include visual and audio content, for example, text, images, video, audio, motion, interactivity, and animation. In further embodiments, interactive content allows a learner to interact with the learning activity through text, hyperlinks, graphical icons and other visual elements, manipulation of graphical elements, auditory elements, and motion elements. In view of the disclosure provided herein, learning activities are created by techniques known to those of skill in the art using machines, software, and languages known to the art. Those of skill in the art will recognize that several digital multimedia formats are suitable including, by way of non-limiting examples, Flash®, QuickTime®, Real Media®, Windows Media®, Silverlight®, Java™, HTML 5, XHTML 5, Unity®, Audio Video Interleave (AVI), and Moving Pictures Expert Group (MPEG).

Voiceover Audio

The systems, products, programs, and methods described herein provide a language immersion teaching environment. Immersion is a method of teaching a target language in which the target language is optionally used for instruction, correction, encouragement, and/or navigation in addition to the content of subject material. Accordingly, the systems, products, programs, and methods described herein include spoken word or voiceover audio in a target language. In some embodiments, the systems, products, programs, and methods described herein include a software module for providing voiceover audio. In some embodiments, spoken word or voiceover audio includes, by way of non-limiting examples, a single recorded voice, recorded conversations between two people, recorded conversations between more than two people, animal sounds, nature sounds, singing, music, and sound effects. In some embodiments, voiceover audio is associated with other media including, by way of non-limiting examples, text, images, video, motion, interactivity, animation, or combinations thereof. In further embodiments, the voiceover audio is synchronized with video, motion, interactivity, animation, or combinations thereof.

In some embodiments, spoken word or voiceover audio is used to instruct a learner or a mentor to a learner. In further embodiments, spoken word or voiceover audio is used to explain how to use software modules, content features, and learning activities. In some embodiments, spoken word or voiceover audio is used to correct a learner when they submit an incorrect response to a learning activity. In further embodiments, spoken word or voiceover audio is used to alert the learner of an incorrect response and provide an example of a more correct response. In some embodiments, spoken word or voiceover audio is used to encourage a learner. In further embodiments, spoken word or voiceover audio is used to congratulate and praise. In some embodiments, spoken word or voiceover audio is used to help a learner or a mentor navigate a computer-based environment. In further embodiments, spoken word or voiceover audio is used to indicate the function of links, buttons, and other navigational elements.

In some embodiments, spoken word or voiceover audio comprises the subject matter of one or more learning activities. In further embodiments, spoken word or voiceover audio is used to model or demonstrate the sounds of phonemes in a target language and their proper pronunciation. In still further embodiments, spoken word or voiceover audio is used to provide practice recognizing phonemes and their sounds within the beginning, middle, and end of words, and joining the sounds to form words as well as breaking words down into phonemes. In some embodiments, spoken word or voiceover audio is used to model or demonstrate, by way of non-limiting examples, vocabulary, sentence structures, and common conversational patterns in a target language.

In light of the disclosure provided herein, those of skill in the art will recognize that several digital audio formats are available for computer-based delivery of spoken word or voiceover audio. These include, by way of non-limiting examples, uncompressed audio formats, such as WAV, AIFF, AU, and PCM; formats with lossless compression, such as FLAC, Monkey's Audio, WavPack, Shorten, TTA, ATRAC Advanced Lossless, Apple® Lossless, MPEG-4, and Windows Media® Audio Lossless; and formats with lossy compression, such as MP3, Vorbis, Musepack, AAC, RealAudio, ATRAC, and Windows Media® Audio Lossy. Audio compression is a form of data compression designed to reduce the transmission bandwidth requirement of digital audio and the storage size of audio files. Audio compression algorithms are implemented in computer software as audio codecs (a truncation of compressor-decompressor or coder-decoder). In some embodiments, spoken word audio is compressed. In further embodiments, audio data is compressed with a lossless codec. In still further embodiments, audio data is compressed with a lossless codec to varying degrees familiar to those of skill in the art. In further embodiments, audio data is compressed with a lossy codec. In still further embodiments, audio data is compressed with a lossy codec to varying degrees familiar to those of skill in the art. In other embodiments, spoken word audio is uncompressed. In some embodiments, spoken word or voiceover audio is included in video or multimedia content. In further embodiments, audio is included in media formats including, by way of non-limiting examples, Windows Media Video (WMV), Motion Picture Experts Group (MPEG), Audio Video Interleave (AVI), QuickTime®, Real Media®, Windows Media®, Flash®, Silverlight®, Java™, HTML 5, XHTML 5, and Unity®.

Recording and Comparing Pronunciation

The systems, products, programs, and methods described herein, in some embodiments, further comprise a software module for recording a language learner's pronunciation of phonemes and words of a target language and comparing them to one or more model pronunciations. In some embodiments, the software module for recording a language learner's pronunciation accesses a microphone associated with the digital processing device. In further embodiments, the microphone is integrated with the processing device. In other embodiments, the microphone is reversibly, but operably connected to the processing device. In still further embodiments, the software module uses APIs of the operating system, a web browser, or another software application to communicate with a microphone associated with the processing device. In some embodiments, the software module is configured to allow a learner to upload a previously recorded pronunciation audio or video file. In some embodiments, the software module for recording a language learner's pronunciation accesses a sound output device or speaker associated with the digital processing device. In further embodiments, the sound output device is integrated with the processing device. In other embodiments, the sound output device is reversibly, but operably connected to the processing device.

Figure 5:
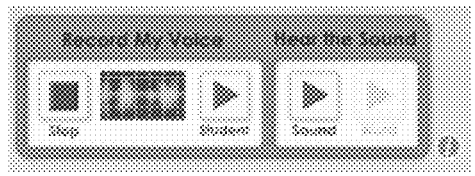
FIG. 5 shows a non-limiting example of a software module for recording a learner's pronunciation of phonemes and words; in this case, a software module allowing a learner to compare their pronunciations to model pronunciations of phonemes and words.

Referring to FIG. 5, in some embodiments, the software module includes features, including GUI elements, associated with recording the voice of a language learner. In further embodiments, the recording GUI elements include, by way of non-limiting examples, a combined (e.g., modal) start/stop button that activates/deactivates voice recording features, separate start and stop button that activate and deactivate voice recording features a play button that plays recorded audio, and a volume control. In still further embodiments, the recording GUI elements include a visual sound or voice indicator. In still further embodiments, the visual indicator is, by way of non-limiting examples, a waveform display, an audio levels display, a graphic equalizer display, or combinations thereof. In some embodiments, recording a pronunciation activates the visual sound or voice indicator and viewing the indicator reveals a visual signature of the pronunciation of a phoneme, word, sentence, or conversation.

Continuing to refer to FIG. 5, in some embodiments, the software module includes features, including GUI elements, associated with comparing the voice of a language learner to a model pronunciation. In further embodiments, the comparing GUI elements include, by way of non-limiting examples, combined or separate start/stop buttons for playing a model phoneme pronunciation, a model word pronunciation, a model sentence, or a model conversation. In further embodiments, playing model pronunciation activates a visual sound or voice indicator and viewing the indicator reveals a visual signature of the pronunciation. In some embodiments, the features associated with recording a learner's voice are displayed closely in proximity to the features associated with comparing a recording to a model such that a learner easily plays recordings of their own voice quickly followed by model pronunciations to access the similarities and differences. In some embodiments, the GUI elements described herein are utilized by interactions including, for example, click with a pointing device such as a mouse, trackpad, or trackball, tap or other gesture with a touchscreen or multi-touch screen, keystroke, or voice command.

In some embodiments, the software module for recording a learner's pronunciation and comparing it to one or more model pronunciations is configured to provide feedback to a learner or a mentor to a learner regarding the comparison. In some embodiments, the feedback is adapted to illustrate the similarities and differences between a learner's pronunciation and a model pronunciation. In further embodiments, the feedback is a waveform analysis. In still further embodiments, data from the visual sound or voice indicator for a learner recording is compared to that for a model pronunciation. In further embodiments, the feedback in the form of a pronunciation score. In still further embodiments, a pronunciation score is mathematically generated by the software module by comparing one or more digital characteristics of a learner recording with those of a model pronunciation.

In light of the disclosure provided herein, those of skill in the art will recognize that in various embodiments a software module for recording a language learner's pronunciation of phonemes and words of a target language and comparing them to one or more model pronunciations is implemented in a multitude of ways. In some embodiments, the software module for recording and comparing pronunciations is a feature integrated into the GUI of the phoneme practice engine described herein. In further embodiments, the software module is accessible by interacting with a link or icon integrated into the GUI of the engine. In further embodiments, the software module is in a layer or level above the GUI of the engine. In some embodiments, the software module for recording and comparing pronunciations comprises a web browser plug-in, add-in, add-on, or extension. In further embodiments, a web browser, plug-in, add-in, add-on, or extension is accessible via, by way of non-limiting examples, click, right click, menu selection, keystroke, touchscreen gesture, or voice command. In some embodiments, the software module for recording and comparing pronunciations comprises a standalone application, which is a program that is run as an independent computer process, not an add-on to an existing process. In further embodiments, a standalone application providing recording and comparison is compiled and executable. In some embodiments, a standalone application is in communication with and adapted for use in conjunction with a language learning activity or a phoneme practice engine, which is implemented separately. In some embodiments, the software module for recording and comparing pronunciations comprises a mobile application. In further embodiments, a mobile application is in communication with and adapted for use in conjunction with a language learning activity or a phoneme practice engine, which is implemented separately.

Translation of Voiceover Audio or Text

The systems, products, programs, and methods described herein include a software module for providing translation of voiceover and/or text from a target language to a specified language. In some embodiments, the software module for providing translation of voiceover and/or text translates voiceover or text, or both voiceover and text associated with, by way of non-limiting examples, instruction, correction, encouragement, navigation, or language learning content. In further embodiments, voiceover and/or text is associated with a learning activity, a language immersion teaching environment, or a phoneme practice engine. In some embodiments, the translation is written. In some embodiments, the translation is voiced. In other embodiments, the translation is both written and voiced. In some embodiments, the software module provides access to written and voiced translation of the most recently played voiceover or the most recently displayed text. In other embodiments, the software module maintains a list of recently played voiceovers and recently displayed text and provides access to written and voiced translation of each (see e.g., FIG. 8). In further embodiments, the software module provides ready access to translation of the most recent voiceover or text and provides, through further interaction, access to translation of a list of additional recent voiceovers and/or text (see e.g., FIG. 8). In further embodiments, a list of translations of recent voiceovers, text, or both, includes translations of the most recent 2, 3, 4, 5, 6, 7, 8, 9, 10, 20, 30, 40, or 50 voiceovers and/or text. In still further embodiments, translations of voiceover and text are accessed by interaction with, for example, an image, icon, text, or link, or other GUI element. In still further embodiments, translations of voiceover and text are accessed by interactions including, for example, click with a pointing device such as a mouse, trackpad, or trackball, tap or other gesture with a touchscreen or multitouch screen, keystroke, or voice command.

In some embodiments, the software module for providing translation of voiceover and/or text produces a written translation by selecting appropriate text data from among a collection of stored data. In various embodiments, text data is stored in formats including, by way of non-limiting examples, Rich Text Format (RTF) and TXT. In further embodiments, text data is encoded according to Unicode or American Standard Code for Information Interchange (ASCII) standards. In some embodiments, the software module for providing translation of voiceover and/or text produces a voiced translation by selecting an appropriate audio data file from among a collection of stored data files. In various embodiments, audio data is stored in formats including, by way of non-limiting examples, MP3, WAV, AIFF, AU, Apple® Lossless, MPEG-4, Windows Media®, Vorbis, AAC, and Real Audio®. In further embodiments, text and audio data files are stored in an electronic repository such as one of the several databases known to the art.

Mentor involvement is often an important factor in the success of a language learning activity and often a factor in the overall success of a language practice environment. A mentor often provides encouragement and motivation in learning a language, even in cases where the mentor is not necessarily fluent or proficient in the target language. In some embodiments, the software module for providing translation of voiceover and/or text is adapted for use by a mentor. In further embodiments, the software module is adapted to facilitate a mentor's promotion of the educational development of a learner. In further embodiments, a mentor selects the specified language into which the software module translates voice and text content. In still further embodiments, a mentor selects a specified language, for example, by use of a pre-populated menu or by text entry, either within the module or in a separate settings or preferences area of a language practice environment. In various embodiments, the specified language is, by way of non-limiting examples, English, Spanish, Italian, Portuguese, French, Dutch, Polish, German, Russian, Ukrainian, Mandarin, Wu, Cantonese, Hindi, Punjabi, Bengali, Marathi, Urdu, Arabic, Turkish, Tamil, Farsi, Japanese, Korean, Vietnamese, That, Burmese, Malay, Telugu, Javanese, and Tagalog. In some embodiments, a mentor regulates access to the software module. In further embodiments, a mentor turns the software module on or off. In further embodiments, a mentor configures in which areas, sections, views, screens, or pages of the environment the software module is available.

Some learners also benefit from the ability to customize their learning experience. In some embodiments, the software module for providing translation of voiceover and/or text is further adapted for use by a learner. In further embodiments, the software module is adapted to facilitate a learner's ability to customize the degree of immersion in the environment. In further embodiments, a learner selects the specified language into which the software module translates voice and text content. In still further embodiments, a learner selects a specified language, for example, by use of a pre-populated menu or by text entry, either within the module or in a separate settings or preferences area of a language practice environment. In some embodiments, a learner regulates their own access to the software module. In further embodiments, a learner turns the software module on or off. In further embodiments, a learner configures in which areas, sections, views, screens, or pages of the environment the software module is available.

In some embodiments, the software module for providing translation of voiceover and/or text is configurable to provide customization of learner immersion by optionally translating voiceover and/or text based on the type, content, or purpose of the voiceover and/or text. In further embodiments, the software module is configurable to translate all voiceover and/or text. In still further embodiments, the software module is optionally configurable to translate voiceover and/or text associated with content of learning activities. In still further embodiments, the software module is optionally configurable to translate voiceover and/or text associated with instructions for learning activities. In still further embodiments, the software module is optionally configurable to translate voiceover and/or text associated with navigation within the environment. In still further embodiments, the software module is optionally configurable to translate voiceover and/or text associated with correction and encouragement of a learner. In still further embodiments, the software module is optionally configurable to translate no voiceover and/or text. In some embodiments, the software module is configurable to translate any combination of the types of voiceover and/or text described herein. In further embodiments translation of voiceover content is configured separately from translation of text content. In further embodiments, a mentor to a language learner configures the types of content translated by the module. In other embodiments, a learner configures the types of content translated by the module.

In light of the disclosure provided herein, those of skill in the art will recognize that in various embodiments a software module for providing translation of voiceover and/or text is implemented in a multitude of ways. In some embodiments, the software module is accessible from every area, sections, view, screen, or page of the phoneme practice engine described herein. In other embodiments, the software module is accessible from select areas, sections, views, screens, or pages of the engine. In further embodiments, the software module is accessible from areas, sections, views, screens, or pages of the engine including voiceover or text pertaining to, by way of non-limiting examples, instruction, correction, encouragement, navigation, language learning content, or any combination thereof. In some embodiments, the software module for providing translation of voiceover and/or text is a feature integrated into the GUI of the phoneme practice engine described herein. In further embodiments, the software module is accessible by interacting with a link or icon integrated into the GUI of the engine. In further embodiments, the software module is in a layer or level above the GUI of the engine.

Figure 6:
FIG. 6 shows a non-limiting example of a software module for translation of voiceover; in this case, a software module for written and voiced translation of English voiceover in a learning activity to Mandarin Chinese.
Figure 7:
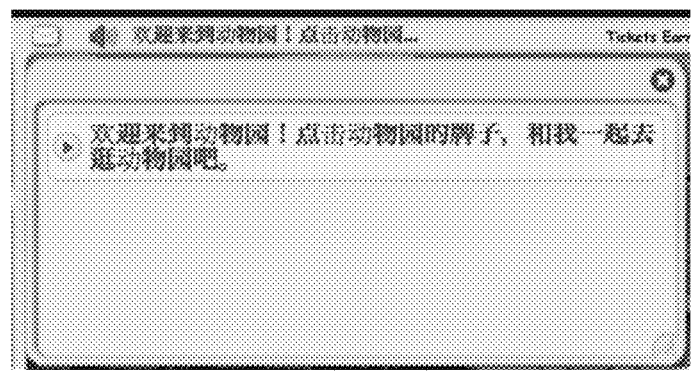
FIG. 7 shows a non-limiting example of a software module for translation of voiceover; in this case, a software module for written and voiced translation of voiceover, which includes full-length translations revealed by interacting with an icon or a truncated translation.
Figure 8:
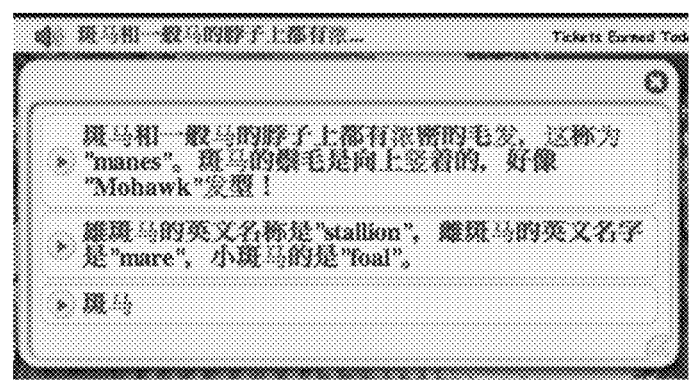
FIG. 8 shows a non-limiting example of a software module for translation of voiceover; in this case, a software module for written and voiced translation of voiceover, which maintains a running list of recent voiceovers.

Referring to FIGS. 6, 7 and 8, in particular embodiments, software module for providing translation is integrated into the language immersion teaching environment. A written translation of the most recently played voiceover is displayed. In cases where the most recently played voiceover is lengthy, the written translation is potentially truncated. Further, a voiced translation of the most recently played voiceover is available by interacting with a speaker icon. Now referring to FIG. 7, in particular embodiments, full-length written and voiced translations of the most recently played voiceover are available by clicking on the text of the written translation. Now referring to FIG. 8, in particular embodiments, the software module provides access to a list of written and voiced translations of the several most recently played voiceovers.

In some embodiments, the software module for providing translation of voiceover and/or text comprises a web browser plug-in, add-in, add-on, or extension. In further embodiments, a web browser, plug-in, add-in, add-on, or extension is accessible via, by way of non-limiting examples, click, right click, menu selection, keystroke, touchscreen gesture, or voice command. In some embodiments, the software module for providing translation of voiceover and/or text comprises a standalone application, which is a program that is run as an independent computer process, not an add-on to an existing process. In further embodiments, a standalone application providing translation is compiled and executable. In some embodiments, a standalone application is in communication with and adapted for use in conjunction with a language learning activity or a phoneme practice engine, which is implemented separately. In some embodiments, the software module for providing translation of voiceover and/or text comprises a mobile application. In further embodiments, a mobile application is in communication with and adapted for use in conjunction with a language learning activity or a phoneme practice engine, which is implemented separately.

Digital Processing Device

The systems, products, programs, and methods described herein include a digital processing device. The digital processing device includes one or more hardware central processing units (CPU) that carry out the device's functions. The digital processing device further comprises an operating system configured to perform executable instructions. In some embodiments, the digital processing device further comprises a memory device, a display, an input device, and optionally a sound output device. In some embodiments, the digital processing device is connected to the Internet such that it accesses the World Wide Web. In other embodiments, the digital processing device is connected to an intranet. In other embodiments, the digital processing device is connected to a data storage device. In some embodiments, the digital processing device is a non-portable device, such as a server or a desktop computer. In other embodiments the digital processing device is a portable device, such as a laptop or tablet computer. In other embodiments the digital processing device is a mobile device, such as a smartphone or digital music player.

The digital processing device includes an operating system configured to perform executable instructions. The operating system is, for example, software, including programs and data, which manages the device's hardware and provides services for execution of applications. Those of skill in the art will recognize that suitable personal computer operating systems include, by way of non-limiting examples, Microsoft® Windows®, Apple® Mac OS X®, UNIX®, and UNIX-like operating systems such as GNU/Linux®. In some embodiments, the operating system is provided by cloud computing. Those of skill in the art will also recognize that suitable mobile smart phone operating systems include, by way of non-limiting examples, Nokia® Symbian® OS, Apple® iOS®, Research In Motion® BlackBerry OS®, Google® Android®, Microsoft® Windows Phone® OS, Microsoft® Windows Mobile® OS, Linux®, and Palm® WebOS®.

In some embodiments, the digital processing device includes a memory device. The memory is one or more physical apparatus used to store data or programs on a temporary or permanent basis. In some embodiments, the memory is volatile and requires power to maintain stored information. In some embodiments, the memory is non-volatile and retains stored information when the digital processing device is not powered.

In some embodiments, the digital processing device includes a visual display. In some embodiments, the display is a cathode ray tube (CRT). In some embodiments, the display is a liquid crystal display (LCD). In further embodiments, the display is a thin film transistor liquid crystal display (TFT-LCD). In some embodiments, the display is a plasma display. In other embodiments, the display is a video projector. In still further embodiments, the display is a combination of devices such as those disclosed herein.

In some embodiments, the digital processing device includes an input device. In some embodiments, the input device is a keyboard or keypad. In some embodiments, the input device is a pointing device including, by way of non-limiting examples, a mouse, trackball, track pad, joystick, game controller, or stylus. In some embodiments, the input device is a touch screen or a multi-touch screen. In other embodiments, the input device is a microphone to capture voice or other sound input. In other embodiments, the input device is a video camera to capture motion or visual input. In still further embodiments, the input device is a combination of devices such as those disclosed herein.

In some embodiments, the digital processing device optionally includes a sound output device. In some embodiments, the sound output device is a pair of headphones, earphones, or ear buds. In some embodiments, the sound output device is an electro-acoustic transducer or loudspeaker. In further embodiments, the sound output device is a flat panel loudspeaker, a ribbon magnetic loudspeaker, or a bending wave loudspeaker. In other embodiments, the sound output device is a piezoelectric speaker. In still further embodiments, the sound output device is a combination of devices such as those disclosed herein.

In accordance with the description provided herein, suitable digital processing devices include, by way of non-limiting examples, server computers, desktop computers, laptop computers, notebook computers, tablet computers, netbook computers, smartbook computers, subnotebook computers, ultra-mobile PCs, handheld computers, personal digital assistants, Internet appliances, smartphones, music players, and portable video game systems. Those of skill in the art will recognize that many mobile smartphones are suitable for use in the system described herein. Suitable tablet computers include those with booklet, slate, and convertible configurations, known to those of skill in the art. Suitable portable video game systems include, by way of non-limiting examples, Nintendo DS™ and Sony® PSP™.

Computer Network

The systems, products, programs, and methods disclosed herein include a digital processing device that is optionally connected to a computer network. A computer network is a collection of computers and/or devices interconnected by communications channels that facilitate communications among users and allow users to share resources. In view of the disclosure provided herein, the computer network is created by techniques known to those of skill in the art using hardware, firmware, and software known to the art. In some embodiments, the computer network is a private network such as an intranet. In some embodiments, the computer network is the Internet. In further embodiments, the Internet provides access to the World Wide Web and the computer program and/or mobile application is provided to the digital processing device via the Web. In still further embodiments, the Internet provides access to the World Wide Web and the computer program and/or mobile application is provided to the digital processing device via cloud computing. In other embodiments, the computer network comprises data storage devices including, by way of non-limiting examples, CD-ROMs, DVDs, flash memory devices, solid state memory, magnetic disk drives, magnetic tape drives, optical disk drives, cloud computing systems and services, and the like. In further embodiments, the computer program and/or mobile application is provided to the digital processing device via a data storage device.

Computer Readable Medium

In some embodiments, the systems, products, programs, and methods disclosed herein include one or more computer readable media encoded with a program including instructions executable by the operating system of an optionally networked digital processing device. In further embodiments, a computer readable medium is a tangible component of a digital processing device. In still further embodiments, a computer readable medium is optionally removable from a digital processing device. In some embodiments, a computer readable medium includes, by way of non-limiting examples, CD-ROMs, DVDs, flash memory devices, solid state memory, magnetic disk drives, magnetic tape drives, optical disk drives, cloud computing systems and services, and the like.

Computer Program

The systems, products, programs, and methods disclosed herein include at least one computer program. The computer program includes a sequence of instructions, executable in the digital processing device's CPU, written to perform a specified task. Those of skill in the art will recognize that the computer program may be written in various versions of various languages. In some embodiments, the computer program comprises one sequence of instructions. In some embodiments, the computer program comprises a plurality of sequences of instructions. In some embodiments, the computer program is delivered from one location. In other embodiments, the computer program is delivered from a plurality of locations. In some embodiments, the computer program is delivered from a cloud computing service. In various embodiments, the computer program comprises, in part or in whole, one or more web applications, one or more mobile applications, one or more standalone applications, one or more web browser plug-ins, extensions, add-ins, or add-ons, or combinations thereof.

Web Application

In some embodiments, the computer program includes a web application written in one or more markup languages, style languages, client-side scripting languages, server-side coding languages, or combinations thereof. In some embodiments, the computer program is written to some extent in a markup language such as Hypertext Markup Language (HTML), Extensible Hypertext Markup Language (XHTML), or eXtensible Markup Language (XML). In some embodiments, the computer program is written to some extent in a style language such as Cascading Style Sheets (CSS). In some embodiments, the computer program is written to some extent in a client-side scripting language such as Asynchronous Javascript and XML (AJAX), Actionscript, Javascript, or Silverlight®. In some embodiments, the computer program is written to some extent in a server-side coding language such as Active Server Pages (ASP), ColdFusion®, Perl, Java™, Hypertext Preprocessor (PHP), Python™, and Ruby. In some embodiments, the computer program utilizes a web framework such as Ruby on Rails (RoR) or .NET. In some embodiments, the computer program is written to some extent in a query language such as Structured Query Language (SQL). In some embodiments, the computer program utilizes a database system such as Microsoft® SQL Server, mySQL™, and Oracle®.

In some embodiments, the language phoneme practice engine is implemented as a web application. In further embodiments, the software module for providing an interface for practicing each phoneme in a taxonomy of phonemes is part of a web application. In further embodiments, the software module for providing an interface for practicing each phoneme in the context of the beginning, middle, and end of words is part of a web application.

Mobile Application

In some embodiments, the computer program includes a mobile application provided to a mobile digital processing device. In some embodiments, the mobile application is provided to a mobile digital processing device at the time it is manufactured. In other embodiments, the mobile application is provided to a mobile digital processing device via the computer network described herein.

In view of the disclosure provided herein, the mobile application is created by techniques known to those of skill in the art using hardware, languages, and development environments known to the art. Those of skill in the art will recognize that mobile applications are written in several languages. Suitable programming languages include, by way of non-limiting examples, C, C++, C#, Objective-C, Java™, Javascript, Pascal, Object Pascal, Python™, Ruby, VB.NET, WML, and XHTML/HTML with or without CSS, or combinations thereof.

Those of skill in the art will also recognize that mobile application development environments are available from several sources. Commercially available development environments include, by way of non-limiting examples, AirplaySDK, alcheMo, Appcelerator®, Celsius, Bedrock, Flash Lite, .NET Compact Framework, Rhomobile, and WorkLight Mobile Platform. Other development environments are available without cost including, by way of non-limiting examples, Lazarus, MobiFlex, MoSync, and Phonegap. Also, mobile device manufacturers distribute software developer kits including, by way of non-limiting examples, iPhone® and iPad® (iOS) SDK, Android™ SDK, BlackBerry® SDK, BREW SDK, Palm® OS SDK, Symbian SDK, webOS SDK, and Windows® Mobile SDK.

Those of skill in the art will recognize that several commercial forums are available for distribution of mobile applications including, by way of non-limiting examples, Apple® App Store, Android™ Market, BlackBerry® App World, App Store for Palm devices, App Catalog for webOS, Windows® Marketplace for Mobile, Ovi Store for Nokia® devices, Samsung® Apps, and Nintendo® DSi Shop.

In some embodiments, the language phoneme practice engine is implemented as a mobile application. In some embodiments, the software module for providing an interface for practicing each phoneme in a taxonomy of phonemes is implemented as a mobile application. In some embodiments, the software module for providing an interface for practicing each phoneme in the context of the beginning, middle, and end of words is implemented as a mobile application.

Standalone Application

In some embodiments, the computer program includes a standalone application, which is a program that is run as an independent computer process, not an add-on to an existing process, e.g. not a plug-in. Those of skill in the art will recognize that standalone applications are often compiled. A compiler is a computer program(s) that transforms source code written in a programming language into binary object code such assembly language or machine code. Suitable compiled programming languages include, by way of non-limiting examples, C, C++, Objective-C, COBOL, Delphi, Eiffel, Java™, Lisp, Visual Basic, and VB .NET, or combinations thereof. Compilation is often performed, at least in part, to create an executable program. In some embodiments, the computer program includes one or more executable complied applications.

In some embodiments, the language phoneme practice engine is implemented as a standalone application. In some embodiments, the software module for providing an interface for practicing each phoneme in a taxonomy of phonemes is implemented as a standalone application. In some embodiments, the software module for providing an interface for practicing each phoneme in the context of the beginning, middle, and end of words is implemented as a standalone application.

Web Browser Plug-In

In some embodiments, the computer program includes a web browser plug-in. In computing, a plug-in is one or more software components that add specific functionality to a larger software application. Makers of software applications support plug-ins to enable third-party developers to create abilities which extend an application, to support easily adding new features, and to reduce the size of an application. When supported, plug-ins enable customizing the functionality of a software application. For example, plug-ins are commonly used in web browsers to play video, generate interactivity, scan for viruses, and display particular file types. Those of skill in the art will be familiar with several web browser plug-ins including, Adobe® Flash® Player, Microsoft® Silverlight®, and Apple® QuickTime®. In some embodiments, the toolbar comprises one or more web browser extensions, add-ins, or add-ons. In some embodiments, the toolbar comprises one or more explorer bars, tool bands, or desk bands.

In view of the disclosure provided herein, those of skill in the art will recognize that several plug-in frameworks are available that enable development of plug-ins in various programming languages, including, by way of non-limiting examples, C++, Delphi, Java™, PHP, Python™, and VB .NET, or combinations thereof.

Web browsers (also called Internet browsers) are software applications, designed for use with network-connected digital processing devices, for retrieving, presenting, and traversing information resources on the World Wide Web. Suitable web browsers include, by way of non-limiting examples, Microsoft® Internet Explorer®, Mozilla® Firefox®, Google® Chrome, Apple® Safari®, Opera Software® Opera®, and KDE Konqueror. In some embodiments, the web browser is a mobile web browser. Mobile web browsers (also called mircrobrowsers, mini-browsers, and wireless browsers) are designed for use on mobile digital processing devices including, by way of non-limiting examples, handheld computers, tablet computers, netbook computers, subnotebook computers, smartphones, music players, personal digital assistants (PDAs), and handheld video game systems. Suitable mobile web browsers include, by way of non-limiting examples, Google® Android® browser, RIM BlackBerry® Browser, Apple® Safari®, Palm® Blazer, Palm® WebOS® Browser, Mozilla® Firefox® for mobile, Microsoft® Internet Explorer® Mobile, Amazon® Kindle® Basic Web, Nokia® Browser, Opera Software® Opera® Mobile, and Sony® PSP™ browser.

In some embodiments, the software module for providing an interface for practicing each phoneme in a taxonomy of phonemes is implemented as a web browser extension, plug-in, add-in, or add-on. In some embodiments, the software module for providing an interface for practicing each phoneme in the context of the beginning, middle, and end of words is implemented as a web browser extension, plug-in, add-in, or add-on.

Software Modules

The systems, products, programs, and methods disclosed herein include, in various embodiments, software, server, and database modules. In view of the disclosure provided herein, the software modules are created by techniques known to those of skill in the art using machines, software, and languages known to the art. In some embodiments, the software modules are in one computer program or application. In other embodiments, the software modules are in more than one computer program or application. In some embodiments, the software modules are hosted on one machine. In other embodiments, the software modules are hosted on more than one machine. In some embodiments, the software modules are hosted on one or more machines in one location. In other embodiments, the software modules are hosted on one or more machines in more than one location.

EXAMPLES

The following illustrative examples are representative of embodiments of the systems, products, programs, and methods described herein and are not meant to be limiting in any way.

Example 1

An 18-year-old college freshman majoring in art at a State University in California is contemplating studying abroad in Beijing for a semester in her junior year. Accordingly, she decides to learn some Mandarin Chinese. After doing some research on the Internet, she chooses to learn with a web application that offers a language phoneme practice engine that she feels will help her start learning the sounds of Mandarin quickly and without frustration. The student accesses the web application on her iPad tablet computer that uses a third generation mobile telecommunications protocol to wirelessly connect to the World Wide Web. The student uses the web browser on her tablet to access the phoneme practice engine.

The phoneme practice engine is based on a taxonomy of phonemes identifying and classifying the most common sounds of Mandarin. Each phoneme in the taxonomy is represented by an image. Each image has an association with a word that the student is familiar with and each word prominently includes the sound of a phoneme. The student finds it rewarding to quickly learn the sounds of Mandarin by using the familiar images and words as mnemonic devices.

The phoneme practice engine provides an interface for practicing each phoneme in the Mandarin taxonomy. The interface includes an interactive button for each phoneme that is labeled with the representative image. Tapping a button on the touchscreen of her iPad triggers an audio voiceover of a model pronunciation of the phoneme spoken by a native Mandarin speaker. The student listens to the many phonemes over and over to gain familiarity. Once she has a basic familiarity with the sounds of her target language, the student explores interfaces that the phoneme practice engine offers for practicing each phoneme in the context of the beginning, middle, and end of Chinese words. For each particular phoneme the student is presented with many words that contain the phoneme. At first she studies words that start with a particular phoneme. Each word is depicted broken down into its component phonemes, which are interactive. When the student taps a phoneme within a word, a voiceover models the sound. Also, each word is associated with an image, which is also interactive. When the student taps an image, a voiceover models the correct pronunciation of the word. She goes on to study words that have a particular phoneme in their middle, and finally, she studies words that end with a particular phoneme.

Example 2

Referring to the student in Example 1, after several days of reading and listening, she decides to try pronouncing some Mandarin words herself. She finds it simple to use a software module that is integrated into each interface provided by the phoneme practice engine to record her voice and compare it to model pronunciations of each phoneme and each word presented. The student makes rapid progress by recording her voice, listening to her pronunciations, and immediately comparing her pronunciations to that of a native Mandarin speaker. After each auditory comparison, the software produces two waveforms for visual comparison. One waveform represents the sound patterns of the model pronunciation; the other represents the sound patterns of her practice pronunciations. The student experiments with different tone, pacing, and accent to try to get the waveforms to match closely.

Example 3

Referring to the student in Example 2, after several more days of practice, she decides to try some of the other language learning activities offered by the web application. The application offers games, puzzles, and interactive books designed to teach her target language. She finds the activities interesting, but finds it difficult to understand the instructions for each activity, which are delivered in Mandarin. She decides to utilize a software module offered by the web application for translation of the content of learning activities from Mandarin to a language that she selects. She opens a settings panel for the translation module and configures it to provide text-based translations of all audio voiceover with the web application that is associated with instructions or navigation. She selects English as the translation language. Each time the phoneme practice engine or any other learning activity presents instructions or navigational cues, the software module for translation provides the student with an English text translation of the most recent voiceover. When the student uses the touchscreen of her tablet to tap on the text translation, she accesses a list of the 10 most recent voiceovers that provided instructions or navigational cues. She finds the language learning activities even more enjoyable with this extra help.

What is claimed is:

1. A computer-based language phoneme practice system comprising:
 (a) a digital processing device comprising an operating system configured to perform executable instructions; and
 (b) a computer program, provided to the digital processing device, including executable instructions that create a language phoneme practice engine, the engine comprising:
  i. a taxonomy of phonemes of a target language, the taxonomy an ordered organization of phonemes to facilitate a sequence of learning;
  ii. a software module for providing an interface for practicing each phoneme in the taxonomy in isolation from any word, the interface simultaneously providing a selection element for each phoneme in the taxonomy, the selection elements presented according to the ordered organization of the taxonomy, wherein the interface allows a learner to interact with each selection element to select a phoneme, the interface further providing a practice element, wherein the interface allows the learner to interact with the practice element to access a visual representation and an auditory representation of the selected phoneme; and
  iii. a software module for providing an interface for practicing each phoneme in the context of the beginning, middle, and end of words of the target language, the interface providing a plurality of words beginning with the selected phoneme, a plurality of words with the selected phoneme in their middle, and a plurality of words ending with the selected phoneme, wherein the interface allows the learner to access a visual and auditory representation of each word, wherein each word is depicted as a composition of phonemes, wherein each phoneme in each word is interactive and allows the learner to access a visual and an auditory representation of each phoneme in each word.

2. The phoneme practice system of claim 1, wherein said taxonomy of phonemes includes phonemes represented by a single letter and phonemes represented by one or more combinations of letters.

3. The phoneme practice system of claim 1, wherein said taxonomy of phonemes includes phonemes represented by an image.

4. The phoneme practice system of claim 1, wherein said taxonomy is comprehensive and comprises all sounds in said target language.

5. The phoneme practice system of claim 1, wherein said module for providing an interface for practicing each said phoneme in the context of the beginning, middle, and end of words identifies the selected phoneme in each word.

6. The phoneme practice system of claim 1, wherein said visual representation of each said word comprises a photographic image or an illustration.

7. The phoneme practice system of claim 1, further comprising a software module for recording said learner's pronunciation of said phonemes and said words and comparing it to one or more model pronunciations of said phonemes and said words.

8. The phoneme practice system of claim 7, wherein said software module for recording said learner's pronunciation and comparing it to one or more model pronunciations is configured to provide visual feedback in the form of waveform analysis or a pronunciation score.

9. The phoneme practice system of claim 1, further comprising a software module for providing translation of audio voiceover, text, or voiceover and text from said target language to a specified language, wherein said translation is both written and voiced.

10. The phoneme practice system of claim 9, wherein said software module for providing translation is configurable to translate voiceover, text, or voiceover and text associated with one or more of: all content, learning content, instructions, navigation, and no content.

11. The phoneme practice system of claim 9, wherein said software module for providing translation of voiceover, text, or voiceover and text maintains a list of recent voiceover, text, or voiceover and text, wherein said list provides access to both written and voiced translation of each said recent voiceover and/or text.

12. The phoneme practice system of claim 9, wherein said software module for providing translation of voiceover, text, or voiceover and text is regulated by a mentor, wherein said mentor determines the types of voiceover, text, or voiceover and text translated.

13. The phoneme practice system of claim 9, wherein said software module for providing translation of voiceover, text, or voiceover and text is regulated by the learner, wherein said learner determines the types of voiceover, text, or voiceover and text translated.

14. The phoneme practice system of claim 1, wherein said phoneme practice system is a component of a larger language immersion teaching system.

15. The phoneme practice system of claim 14, wherein said language immersion teaching system comprises a plurality of learning activities organized according to an instructional plan, wherein said instructional plan comprises a progression of educational objectives including teaching phoneme sounds, phoneme sounds in the context of the beginning, middle, and end of words, word families, vocabulary in the context of environments or themes, sentence structures, and common conversational patterns.

16. The phoneme practice system of claim 1, wherein said target language is one or more of: English, Spanish, Italian, Portuguese, French, Dutch, Polish, German, Russian, Ukrainian, Mandarin, Wu, Cantonese, Hindi, Punjabi, Bengali, Marathi, Urdu, Arabic, Turkish, Tamil, Farsi, Japanese, Korean, Vietnamese, Thai, Burmese, Malay, Telugu, Javanese, and Tagalog.

17. The phoneme practice system of claim 16, wherein said target language is English.

18. Non-transitory computer readable media encoded with a computer program including instructions executable by the operating system of a digital processing device, wherein said instructions create a language phoneme practice engine, the engine comprising:
  a. a taxonomy of phonemes of a target language, the taxonomy an ordered organization of phonemes to facilitate a sequence of learning;
  b. a software module for providing an interface for practicing each phoneme in the taxonomy in isolation from any word, the interface simultaneously providing a selection element for each phoneme in the taxonomy, the selection elements presented according to the ordered organization of the taxonomy, wherein the interface allows a learner to interact with each selection element to select a phoneme, the interface further providing a practice element, wherein the interface allows the learner to interact with the practice element to access a visual representation and an auditory representation of the selected phoneme; and
  c. a software module for providing an interface for practicing each phoneme in the context of the beginning, middle, and end of words of the target language, the interface providing a plurality of words beginning with the selected phoneme, a plurality of words with the selected phoneme in their middle, and a plurality of words ending with the selected phoneme, wherein the interface allows the learner to access a visual and auditory representation of each word, wherein each word is depicted as a composition of phonemes, wherein each phoneme in each word is interactive and allows the learner to access a visual and an auditory representation of each phoneme in each word.

19. A computer-implemented language phoneme practice method comprising the step of providing executable instructions to a digital processing device comprising an operating system configured to perform executable instructions, to create a language phoneme practice engine, the engine comprising:
  a. a taxonomy of phonemes of a target language, the taxonomy an ordered organization of phonemes to facilitate a sequence of learning;
  b. a software module for providing an interface for practicing each phoneme in the taxonomy in isolation from any word, the interface simultaneously providing a selection element for each phoneme in the taxonomy, the selection elements presented according to the ordered organization of the taxonomy, wherein the interface allows a learner to interact with each selection element to select a phoneme, the interface further providing a practice element, wherein the interface allows the learner to interact with the practice element to access a visual representation and an auditory representation of the selected phoneme; and
  c. a software module for providing an interface for practicing each phoneme in the context of the beginning, middle, and end of words of the target language, the interface providing a plurality of words beginning with the selected phoneme, a plurality of words with the selected phoneme in their middle, and a plurality of words ending with the selected phoneme, wherein the interface allows the learner to access a visual and auditory representation of each word, wherein each word is depicted as a composition of phonemes, wherein each phoneme in each word is interactive and allows the learner to access a visual and an auditory representation of each phoneme in each word.

* * * * *